(12) United States Patent
Mikkelsen et al.

(10) Patent No.: US 7,521,074 B2
(45) Date of Patent: Apr. 21, 2009

(54) METHOD FOR PRODUCING COMPRESSED CHEWING GUM TABLETS

(75) Inventors: Rikke Mikkelsen, Vejle (DK); Kaj Hovhave Nielsen, Otterup (DK); Niels Ravn Schmidt, Barrit (DK); Per Henrik Ertebjerg Christensen, Odense (DK)

(73) Assignee: Gumlink A/S, Vejle (DK)

( * ) Notice: Subject to any disclaimer, the term of this patent is extended or adjusted under 35 U.S.C. 154(b) by 225 days.

(21) Appl. No.: 10/555,871

(22) PCT Filed: May 6, 2004

(86) PCT No.: PCT/DK2004/000318

§ 371 (c)(1),
(2), (4) Date: Jan. 30, 2006

(87) PCT Pub. No.: WO2004/098305

PCT Pub. Date: Nov. 18, 2004

(65) Prior Publication Data

US 2006/0257523 A1        Nov. 16, 2006

(30) Foreign Application Priority Data

May 6, 2003    (EP)   ................... 03388032

(51) Int. Cl.
*A23G 4/20*          (2006.01)

(52) U.S. Cl. .......... 426/3; 426/285; 426/454; 426/516

(58) Field of Classification Search .............. 426/3, 426/5, 516, 285, 454
See application file for complete search history.

(56) References Cited

U.S. PATENT DOCUMENTS

| 2,290,120 | A | 7/1942 | Thomas |
| 3,262,784 | A | 7/1966 | Bucher |
| 4,117,645 | A | 10/1978 | Phillips |
| 4,161,544 | A | 7/1979 | Kaul |
| 4,405,647 | A | 9/1983 | Fisher et al. |
| 4,737,366 | A | 4/1988 | Gergely et al. |
| 5,154,939 | A | 10/1992 | Broderick et al. |

FOREIGN PATENT DOCUMENTS

| EP | 0221850 | 5/1987 |
| WO | WO 99/33353 | 7/1999 |
| WO | WO 02/094032 A1 | 11/2002 |
| WO | WO 03/053156 A1 | 7/2003 |

*Primary Examiner*—Arthur L Corbin
(74) *Attorney, Agent, or Firm*—Sughrue Mion, PLLC

(57) ABSTRACT

The invention relates to a method for producing chewing gum granules. The method comprises at least the steps of feeding a gum composition including at least gum base into an extruder (2), pressurizing the gum composition in the extruder, extruding the gum composition through a die plate (5), and cutting the extruded gum composition in a liquid filled chamber (4) so that the cut gum granules have weights per granule in the range of 0.0001 g to 0.008 g.

18 Claims, 1 Drawing Sheet

METHOD FOR PRODUCING COMPRESSED CHEWING GUM TABLETS

Figure 1:
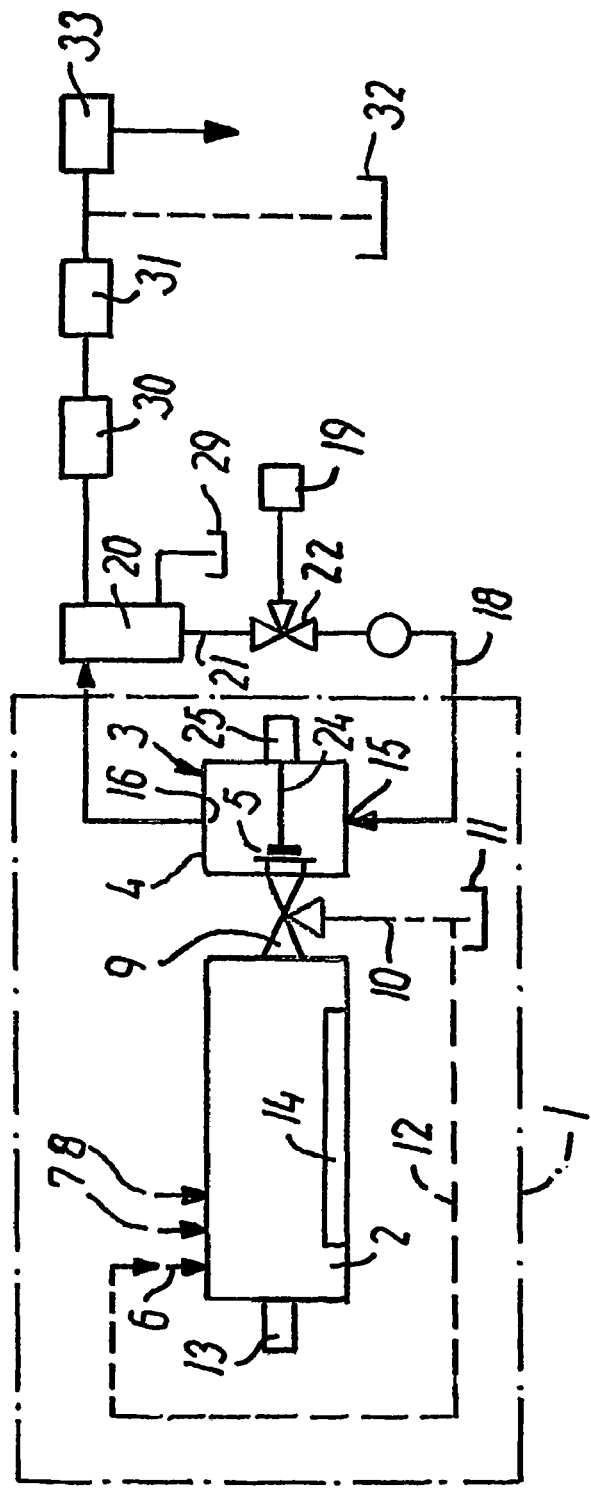

The present invention relates to a method for producing chewing gum products, which method comprises at least the steps of feeding a gum composition including at least gum base into an extruder, pressurizing the gum composition in the extruder, extruding the gum composition through a die means, and cutting the extruded gum composition in a liquid filled chamber.

U.S. Pat. No. 4,117,645 disclose a chewing gum base formulated as a hot viscous blend, which is extruded in an extruder though a die plate after which the extruded product is cut into pellets in a liquid that also cools the extruded product. The liquid and the formed pellets are conveyed to bulk containers for transport to further processing, i.e. dewatering and mechanical mixing with other ingredients to produce chewing gum.

A similar process is disclosed in WO 02/094032, which describes a process and apparatus for producing gum pellets by extrusion through a die plate and cutting of pellets in a liquid-filled chamber. The ingredients comprising gum base, fillers, sweeteners, intense sweeteners and flavour are mixed beforehand to form a mixture, e.g. a bubble gum mixture. The mixture is feed to an extruder and extruded and pelletized. The liquid transports the pelletized product to a centrifugal dryer that separates the product from the liquid. The separated products are then dusted with an anti-agglomerating compound and coated or otherwise packaged for consumption.

In these prior art processes the produced pellets have individual weights of about 0.1 g or larger. The gum composition extruded through the die means contains gum base and is a high-tack composition with very poor flow properties. In case the pellets are dusted and coated for use as a miniature gum ball product, the individual pellet weight of 0.1 g is very low, but however acceptable for chewing gum products that are consumed many at the time. In the case of mechanical mixing of the pellets with other ingredients in order to produce chewing gum, the pellets can have a rather high individual weight. The mixing involves heating and mixing into a homogenous, coherent mass, which after cooling is shaped into gum centres and coated to form the final chewing gum.

An object of the present invention is to provide a method for producing chewing gum products having improved composition.

The method of the present invention is accordingly characterized in that the cutting in the liquid filled chamber produces gum granules of weights per granule in the range of 0.0001 g to 0.008 g, and that the extruded and cut granules are conveyed in a further step to a tablet pressing apparatus and included in compressed chewing gum tablets.

The low weight of the granules results in a very quick cooling of the granules in the liquid flowing through the liquid-filled chamber. During extrusion through the die means the gum composition is at an elevated temperature suitable for the extrusion process. Due to the low weight of the granules their individual capacity for holding heat is limited and the cooling action from the liquid quickly lowers the temperature after granules are cut off into the liquid. Gum composition has quite low heat conductivity, but due to their low weight the granules are nevertheless cooled right to their centre in short time.

The quick cooling acts to preserve possible fragile ingredients in the gum composition so that their qualities are better kept intact and conveyed into the granules included in the final gum product. This improved quality of the gum composition in the granules improves the general composition of the chewing gum product.

By conveying the granules to a tablet pressing apparatus and including them in compressed chewing gum tablets there are obtained several further advantages contributing to improved composition of the chewing gum product.

The improved quality of the gum composition in the granules is maintained in the gum product because the granules are included in the product by simply being compressed into being a part of tablets, other parts of which can be bulk sweeteners and additional ingredients, and possibly a coating. The previously used combination of pellets with other ingredients by heating and mixing pellets and ingredients into a homogenous, coherent mass is thus avoided. The combination of various ingredients in the tabletting apparatus is gentle and well suited for fragile ingredients.

The content of gum base in the granules results in granules having a good tackiness, and the small weight of the individual granule leads to use of many granules in the individual tablet and thus to a distribution in the tablet of granules of tacky gum composition. Although the tablet typically is composed of further ingredients, such as bulk sweeteners etc., in addition to the granules, the well distributed granules act to make the various ingredients unite into a common mass during the initial chews in the mouth.

Tabletting is also well suited for addition of further active ingredients such as pharmaceutical agents, sweets or nutrients, if such are desired in the compressed gum tablets, and the small weight of the granules allows a fine distribution of the further ingredients within the tablets and thus a better composition and release.

Preferably the cutting in the liquid filled chamber produces gum granules of weights per granule in the range of 0.0003 g to 0.008 g. The lower limit of 0.0003 g allows many granules to be included in a tablet of a given weight and thus improves the distribution of the tacky granules within the tablet.

It is possible to make granules of different weights on purpose. For one and the same setup there will, however, also be some variation in the weights of the cut granules, depending on inevitable variations in gum composition, temperatures etc. at the die means. The weight mentioned in the present context is an average weight of granules produced with the intention of obtaining granules of a specific intended weight.

In order to obtain a more dense packing of the granules in the tabletting apparatus, the weight per granule for at least a first fraction of the granules is in the range of 0.0003 g to 0.003 g, preferably less than 0.002 g.

It is also possible to provide a less light fraction by producing the granules so that the weight per granule for at least a second fraction of the granules is in the range of 0.002 to 0.02 g, preferably in the range from 0.002 to 0.008 g, suitable in the range from 0.002 g to 0.005 g.

The granules in a first fraction have a first average weight, which is lower than the average weight of a second fraction of the extruded granules. This can be utilized to mix granules having different weight fractions to obtain even better properties of the compressed chewing gum tablets.

Granule fractions of different average weights can be produced with two different setups, each producing a batch of granules of a particular average weight, followed by a blending of the fractions. It is also possible to design a die means with die openings of at least two different sizes to simultaneously obtain granules with different average diameters. Thus it is possible to obtain granules having different weights. More than two different average weights may be obtained, depending on the design of the die means in use. It is for instance possible to obtain granules with three, four or more different average weights although two different weights are preferred.

The granules can be cut in a very large liquid-filled chamber, in which the granules are also cooled, but preferably the cooling is combined with transfer of the granules away from the chamber. This can be done e.g. by cooling the cut granules in water during transfer from the liquid filled chamber to a de-watering device. The transfer time from cutting to de-watering can be less than 6 s. The advantage of this is that water-soluble ingredients in the gum composition are not unnecessarily washed out of the granules. Optionally, the total time of contact between granules and cooling water can be further limited to less than 4 s.

It is possible to convey gum granules to the tablet pressing apparatus without any intermediate treatment, but preferably the granules are dusted or coated in between de-watering and conveyance to the tablet pressing apparatus. The dusting can serve the traditional purpose of avoiding agglomeration of granules in the equipment leading to the tablet pressing apparatus.

The dusting or coating can be done with ingredients selected from the, group comprising magnesium stearate, cornstarch, sugar compounds, polyols, cellulose ethers, acrylic polymers and copolymers, sweeteners, flavours, waxes, or colours. Preferably the dusting or coating is made with a sweetener like sorbitol. Sorbitol has been found to also function as an anti-agglomerating agent in addition to improving the taste of the final chewing gum product.

In order to control in detail the properties of the compressed chewing gum tablets it is preferred that the method comprises a further step of classifying the granules as to weight prior to conveyance to the tablet pressing apparatus. Too heavy granules are separated from the remaining granules.

Before the granules are delivered to the tablet pressing apparatus they are preferably mixed with one or more ingredients selected from the group comprising flavours, bulk sweeteners, intense sweeteners, colouring agents, fillers, nutrients, pharmaceuticals, and tabletting aids. This mixing can improve the flowability of the mixed ingredients fed to the tablet pressing apparatus.

It is preferred that the gum composition fed to the extruder is a gum base, and that it at least includes one or more flavouring agents when extruded through the die means. The flavours within the granules cause a prolonged release of taste during mastication.

The gum composition can furthermore include one or more sweeteners, preferably intense sweeteners, when extruded through the die means. The sweeteners within the granules cause a prolonged release of sweetness during mastication. The gum composition can be pre-mixed with sweetener and/or flavour and optionally other ingredients before it is fed to the extruder. Alternatively, or additionally, sweetener and/or flavour may be mixed into the gum composition in the extruder.

Moreover, the present invention also relates to use of the method for production of compressed chewing gum tablets.

The invention also relates to compressed chewing gum tablets obtained by the methods described above. Although very large tablets of 3 g or more can be made, or very small tablets of 0.4 g or less can be made, the tablets preferably have a weight in the range of 0.5 g to 2.5 g per tablet, preferably from 0.6 g to 1.5 g per tablet.

For tablets within these weight ranges the composition of the tablets can be chosen with a view to obtain high integrity of the tablets in that the individual tablet includes at least 35 granules of a gum composition comprising at least 51% Wt. of gum base. This minimum content of gum base in the granules provides a relatively high tackiness to the granules.

An even higher degree of distributed tack in the compressed chewing gum tablets can be obtained by including at least 125 granules of gum composition in the individual tablet, and at the same time other desired properties of the tablets can be obtained by including one or more additional components, such as bulk sweetener powder, flavours, nutrients, pharmaceuticals, or fillers.

Figure 2:
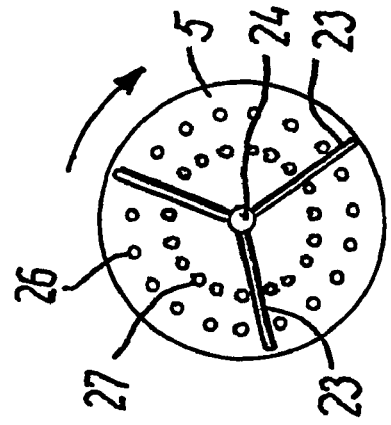

Non-limiting examples and embodiments of the method according to the invention are in the following described in further detail with reference to the highly schematic drawings, in which FIG. 1 is a diagram illustrating a chewing gum granulating system, and FIG. 2 illustrates in an end view a die plate with rotary knives for cutting extruded granules.

As used herein the term "gum base" refers in general to a commercially available gum base suitable for production of chewing gum. Such gum bases normally comprise natural and/or synthetic resins and optionally other ingredients.

The term "gum composition" as used herein may be a gum base as defined above, a gum base comprising one or more ingredients (e.g. sweetener, flavour, colouring agents, fillers etc.), or it may be a chewing gum composition as defined below.

The term "chewing gum composition" is the final formulation, which constitutes at least a part of the compressed chewing gum tablets ready for sale to or use by the consumer. A chewing gum composition may comprise sweetener and/or flavour and optionally other ingredients like colouring agents, pharmaceutical agents, enzymes, humectants, flavour enhancers, anticaking agents etc.

Furthermore "chewing gum product" or "compressed chewing gum tablets" denote a ready for use chewing gum, e.g. comprising compressed granules of chewing gum composition possibly mixed with sweeteners, flavour or other ingredients and optionally coated.

The term "gum granules" or "granules" as used herein: refers to particulate material of gum composition having average diameters below about 3 mm, such below 2.5 mm.

The term "average weight" as used herein is defined as the average weight of at least 200 granules produced to obtain the same intended weight (produced under practically identical conditions).

Unless otherwise indicated all percentages are weight % (denoted % Wt.).

In FIG. 1 a chewing gum granulating system generally denoted 1 comprises at least an extruder 2 and a granulating apparatus 3 having a chamber 4 with a die plate 5. The extruder 2 is equipped with a first inlet with a hopper 6 for feeding gum composition to the extruder 2. In the illustrated embodiment the extruder 2 is further equipped with additive feeding devices 7 and 8 connected to further inlets for feeding additives to the gum composition in the extruder 2. The additive feeding device 7 can e.g. be used for adding sweetener, and the additive feeding device 8 can e.g. be used for adding flavour.

The extruder 2 delivers pressurized gum composition to the inlet side of die means in the form of a die plate 5, via a flow connection between an outlet on the extruder and an inlet of the granulating apparatus. The flow connection is provided with a valve 9, which in one position provides unrestricted passage from the extruder to the die plate, and in another position connect the extruder outlet with a drain pipe 10, which either leads to a receptacle 11 for discharged gum composition or to a recycling pipe 12 by which the gum composition can be recycled to hopper 6.

The extruder 2 can be a single or double screw extruder provided with a drive motor 13, preferably an electric motor with settable speed, or a hydraulic motor. In another embodiment of the extruder feeding devices 7, 8 have been omitted, and hopper 6 can then be supplied with pre-mixed gum composition of any desired type. The extruder has one or more heating devices 14 which can be included in the barrel of the extruder or can be associated with the screw. The heating device or devices can e.g. be of electrical heater type or heat exchanger type where the latter can be supplied with heating fluid such as hot water or hot oil. The die plate can also be provided with a heating device, which typically is of the type of internal channels in the plate, and a supply of hot heating liquid feeding the internal channels with the required amount of heat.

The liquid-filled granulating chamber 4 has an inlet 15 for cooling liquid and an outlet 16 for a slurry of suspended granules and cooling liquid. The cooling liquid is supplied by a pump 17 via an inlet pipe 18, and the pump can be fed with fresh cooling liquid from a source 19 or it can be supplied with re-circulated cooling liquid from a de-watering unit 20 via a pipe 21. A control valve 22 regulates the degree of re-circulation. The system can also have an intercooler (not shown) for cooling re-circulated cooling liquid.

Cutting means, such as rotating knives 23, act on the outlet side of the die plate. The gum composition extruded through openings in the die plate is cut into granules by the cutting means. The cutting means can be reciprocating knives, but is preferably embodied as rotating knives 23 mounted at the end of a drive axle 24 which is driven by a motor 25, such as an electric motor or a hydraulic drive motor. The motor 25 preferably has settable speed.

The die plate is exchangeable so that several different die plates with different configuration of the openings can be used in the same granulating apparatus. The actual die plate configuration is chosen according to the desired weight of granules. It is possible to use a die plate with a plurality of uniformly sized openings in order to produce a batch of gum granules with practically uniform weight (the first average weight). Another batch of granules with a different, second average weight can be produced by making another run using a different die plate configuration. It is, however, preferred to use a die plate provided with differently sized openings so that granules of different weights can be simultaneously produced in the same run. Gum compositions comprising more than 51% Wt. gum base, e.g. 55% Wt. gum base, or more than 71% Wt., can also be extruded through the die plate with differently sized openings.

FIG. 2 depicts an example of such a die plate 5 where an outer row of openings 26 are larger than an inner row of openings 27. The openings can be provided in any desired configuration of sizes and patterns, the pattern and sizes being selected so that the desired weights of granules are obtained.

An outlet pipe 28 connects outlet 16 with a dryer device in the form of de-watering unit 20, in which the granules are separated from the cooling liquid. The dryer device can be of any commercially available type. Spent cooling liquid can be drained off to drain 29 or be re-circulated via pipe 21. The dryer can also be associated with a mixer 30 wherein the granules are mixed with e.g. anti-agglomerating agent, sweetener, flavour, tabletting aids etc. to form a mixture. The system can optionally include a classifying unit 31 with one or more sieves. The granules can be stored temporarily in a storage 32. Granules are either directly after de-watering and possible dusting or coating or after a possible intermediate storage and/or mixing with granules of different average weights or types fed to a tablet pressing machine 32 in which the granules are included in compressed gum tablets.

The weight of granules are controlled by several factors such as opening sizes, the gum composition, gum temperature at and pressure drop across the die means. Also the rotating speed of the cutting knives and the number of knives can influence the resulting weight of the individual granules. Larger openings and higher temperatures and higher pressures tend to increase the weight by increasing the extrusion speed, and higher rotating speed and more knives tend to decrease the weight by cutting an extruded amount of gum composition into more granules. The relation between the diameters of the openings in the die device and the average weights of granules produced from a specific gum composition may be determined by the skilled person on basis of routine experiments.

The gum base used in the method according to the invention may be any water-insoluble gum base well known in the art. Illustrative examples of suitable polymers for gum base include, natural and synthetic elastomers, resins and rubbers. For example, suitable polymers include substances of vegetable origin such as rubber latex solids, chicle, gelutong, nispero, rosidinha, pendare, perillo, niger gutta, tunu, gutta percha, and crown gum. Synthetic elastomers such as butadiene-styrene copolymers, isobutylene-isoprene copolymers, polyethylene, polyisobutylene, petroleum wax and polyvinylacetate and mixtures thereof are also useful in gum base.

Gum base may also contain elastomer solvents to aid in softening the gum base. Such materials may include methyl, glycerol or pentaerythritol esters of rosins; methyl, glycerol or pentaerythritol esters of modified rosins, such as hydrogenated, dimerized or polymerized rosins; mixtures thereof and the like. Examples of such materials include pentaerythritol esters of partially hydrogenated wood rosin, pentaerythritol esters of wood rosin, glycerol esters of partially dimerized rosin, glycerol esters of polymerized rosin, glycerol esters of tall oil rosin, glycerol esters of wood rosin or partially hydrogenated wood rosin, partially hydrogenated metal esters of rosin such as polymers of alpha.-pinene or .beta.-pinene, terpene resins including polyterpene, mixtures thereof and the like.

A variety of traditional ingredients such as plasticizers or softeners, such as lanolin, stearic acid, sodium stearate, potassium stearate, glyceryl, triacetate, glycerine, natural waxes, petroleum waxes such as polyurethane waxes, paraffin waxes and microcrystalline waxes, may also be incorporated into a gum base to obtain a variety of desirable textures and consistency properties.

Other conventional ingredients that may be present in a gum base include a hydrophilic-type detackifier that will absorb saliva and become slippery. The hydrophilic type detackifier should preferably be incompatible with the elastomer and solvent for the elastomer, and may include such materials as polyvinyl acetate, polyvinyl butyl ether, copolymers of vinyl esters and vinyl ethers, mixtures thereof and the like.

The gum base may also include hard waxes that serve as lubricants. Examples of such hard waxes include candelilla wax, paraffin wax, carnauba wax, ozokerite, oricuri, microcrystalline wax and the like.

The gum base may also include a softening agent and/or lubricant that may comprise one or more hydrogenated vegetable or animal fats preferably having a high melting point above about 22° C.

The gum base may also include an emulsifier to impart hydrophilic properties to the gum base. The emulsifier causes saliva to be absorbed into the gum base, thereby making the gum base slippery. Examples of such emulsifiers may include glyceryl monostearate, phosphatides such as lecithin and sephalin, mixtures thereof and the like.

The gum base may also include particles of chalk or the like as a bulking agent and/or texturizer. Examples of such texturizing agents or inert fillers suitable for use in gum base include, calcium carbonate, aluminum hydroxide, alumina, magnesium carbonate, talc, aluminum silicates, mixtures thereof and the like.

Such gum bases are well known in the art, and may be modified to provide a variety of consistency, texture and other properties to the chewing gum product.

With regard to sweeteners, a distinguishing between bulk sweetener and intense sweetener (high potency sweetener) is often relevant. Bulk sweetener are well known sweeteners such as sucrose, dextrose, dextrins, maltose, trehalose, D-tagatose, dried invert sugar, ribose, fructose, levulose, galactose, glucose, maltodextrin, polydextrose, isomalt, sorbitol, sorbitol syrup, mannitol, xylitol, hexaresorcinol, maltitol, isomaltol, erythriol, lactitol, xylose, tagatose and hydrogenated starch hydrolysates (maltitol syrup). Intense or high potent sweeteners includes the dipeptides aspartame, neotame and alitame; N-sulfonylamides such as saccharin including the salts thereof and acesulfam including the salts thereof; sulfamates such as cyclamate including the salts thereof; chlorinated sugar derivatives such as sucralose; Terpenoid glycosides such. as Rebaudioside-A, Stevioside and Glyhyrrhizin; proteins such as thaumatin and monellin and Di-hydrochalcones. The gum composition to be extruded and granulated is typically substantially free of bulk sweetener. Bulk sweeteners are normally water soluble and may to some extent be dissolved from the gum composition granules in the liquid filled chamber.

The flavouring agents suitable for use in the present invention can e.g. be a natural, natural-identical, or artificial flavouring substance, or a mixture thereof. At room temperature the flavouring agent may be in solid state as a dry powder or flavour granules, or in liquid state as an essence or oil, or mixtures thereof. The dry flavours may include standard powder (i.e. a liquid flavouring agent mixed homogeneously with a powder carrier material), spray dried powder whereby the flavouring agent is coated by a protective layer (i.e. microencapsulated), freeze dried powder, or flavour granules. Flavour granules differ from the powders by substantially larger particle sizes (approximately 500-1500 μm) compared to powders (approximately 10-150 μm). Optionally these flavour granules may also comprise a colouring agent and thereby provide a visual effect in the product. Furthermore, seeds derived from berries and fruits may also be included as dry flavouring agents.

The liquid flavouring agents may include essences also known as extracts which are concentrated flavouring agents produced either by reducing a liquid until it is a syrup or by dissolving a spice or flavouring oil in alcohol, and essential oils also known as flavouring oils which are highly concentrated essences.

Preferably, the solid and the liquid flavouring agents are encapsulated in a protective matrix protecting them from heat and moisture and thereby reducing the oxidation and evaporation of the liquid flavouring agent. As a result the stability of the flavouring agent is markedly improved extending the shelf life of the product. These encapsulating processes are well known to those skilled in the art.

A variety of one or more flavouring agents may be used. Flavouring agents suitable for use in the present invention include natural, natural-identical, and/or artificial flavouring substance, or mixtures thereof, in their solid and/or in their liquid state.

The person skilled in the art will recognize that natural and artificial flavouring agents may be combined in any sensorially acceptable blends.

The gum composition to be extruded may, furthermore, be mixed with colouring agents to obtain desirable visually effects. Useful commercially available colouring agents are DUA LAKE or EURO LAKE, which can be provided in various colours. Natural colours like e.g. riboflavin, beta-carotene, chlorophyll and hibiscus are also suitable. Optionally gum granules in different colours may be used to provide a tablet with more colours.

The gum composition may be feed to the extruder as conventionally pellets or it may be feed to the extruder as hot viscous coherent composition directly from the gum base production line. The gum composition may be pure gum base or gum base mixed with e.g. sweetener or flavour. The hot composition will normally have a temperature in the range of 95 to 135° C., preferably in the range 105 to 125° C., which is sufficient to heat the extruder. In this case it is not necessary to have heating means on the extruder. Optionally, the gum composition is cooled before entering the extruder, suitable to a temperature of 70° C. or below. After being extruded to the die plate, the gum composition is cooled by the water in the granulating chamber. Optionally the gum base production line may feed several extruders in order to increase capacity or to obtain granules with different size and characteristics.

During extrusion of the gum composition the differential pressure between the gum composition in the extruder and the gum composition in the liquid filled chamber, i.e. the pressure drop across the die means is suitable above 10 bar, preferably above 18 bar, such as in the range of 25 to 90 bar. The temperature of the gum composition in the extruder is preferably in the range of 40 to 125° C., suitable in the range 50 to 115° C. The temperature of the die means is preferably in the range of 60 to 190° C., suitable in the range 80 to 180° C. The temperature of the liquid in the liquid filled chamber is conveniently in the range of 1 to 25° C. The optimum for the pressures and temperatures in the method according to the invention can, however, be determined by the skilled person as a matter of routine. The optimum values for specific gum compositions, varies of course, depending on the composition.

The tablet pressing machine may be any conventional tablet pressing machine capable of pressing tablets comprising gum granules. The final tablets preferably have a weight in the range of 0.5 to 2.5 g, conveniently in the range of 0.6 to 1.5 g.

EXAMPLES

Example 1

A commercially available gum base based on synthetic resins (DANfree T firm 1, available from Gumlink A/S, Denmark) was used the gum base in the production of chewing gum products according to the invention.

Gum base in the form of pellets was for a type A composition fed directly to the extruder, and for type B or type C the gum base was mixed with menthol flavour crystals (MENTHOL BP/USP, available from SHARP MENTHOL INDIA LIMITED, India) aspartame powder (Aspartame, available from ZHUN YONGXINRONG BIOCHEMICAL PRODUCTS CO., LDT, China), and acesulfame-K (Sunett, particle size A, available from Nutrinova GmbH, Germany) to form a gum composition as shown in Table 1. For the type A and type B compositions mint oil (PD3-68H, type 1100102, available from A.M.TODD COMPANY, U.S.A) was added in an amount of approx. 4.22% Wt. and mixed to the gum composition in the extruder.

The gum compositions were fed individually to an extruder (Leistrits ZSE/BL 360 kw 104, available from GALA GmbH, Germany). The resulting gum composition was extruded to a granulator comprising a die plate and liquid filled chamber (granulator A5 PAC 6, GALA GmbH, Germany) connected to a water system comprising a water supply for the granulator and centrifugal dryer (TWS 20, available from GALA GmbH, Germany).

TABLE 1

| Ingredient | Gum composition | | |
|---|---|---|---|
| | Type A | Type B | Type C |
| | Amounts % Wt. | | |
| gum base | 95.8 | 89.24 | 93.35 |
| menthol flavour crystals | 0 | 6.08 | 6.15 |
| aspartame powder | 0 | 0.23 | 0.25 |
| acesulfame K | 0 | 0.23 | 0.25 |
| mint oil* | 4.2 | 4.22 | 0 |

*mint oil was added in the extruder

The type A gum composition of Table 1 was feed to the extruder with a feed rate of 250 kg/h and an extruder screw speed of 139 rpm. The temperature in the gum composition at the feed end of the extruder was 44° C. and the temperature of the gum composition at the outlet of the extruder was 109° C. The gum composition was delivered by the extruder device to the inlet side of a die plate at a pressure of 36 bar. The composition was extruded through the die plate having a temperature of 120° C. and 24 holes of a diameter of 1.0 mm. In the granulator chamber the extruded composition was cut to granules by a cutter with 8 blades mounted in star shape on a central axle rotating with a cutter speed of 1801 rpm. The granules were cooled and transported to the centrifugal dryer in water with a temperature of 17° C. and a flow rate of 22 m³/h. The average cooling and transport time in water was approx. 2 seconds. The individual granules had an average weight of 0.002 g. The granules were tabletted as described below.

Example 2

The type A gum composition of Table 1 was fed to the extruder with a feed rate of 250 kg/h and delivered to the inlet side of the die plate at a temperature of 110° C. and a pressure of 52 bar. The composition was extruded through a die plate having a temperature of 119° C. and 24 holes of a diameter of 1.0 mm. In the granulator chamber the extruded composition was cut to granules by a cutter with 8 blades on a central axle rotating with a cutter speed of 2800 rpm. The granules were cooled and transported to the centrifugal dryer in water with a temperature of 18° C. and a flow rate of 23 m³/h. The average cooling and transport time in water was approx. 2 seconds. The individual granules had an average weight of 0.008 g. The granules were tabletted as described below.

Example 3

The type A gum composition of Table 1 was fed to the extruder with a feed rate of 200 kg/h and delivered to the inlet side of the die plate at a temperature of 111° C. and a pressure of 72 bar. The composition was extruded through a die plate having a temperature of 149° C. and 120 holes of a diameter of 0.5 mm. In the granulator chamber the extruded composition was cut to granules by a cutter with 8 blades on a central axle rotating with a cutter speed of 2200 rpm. The granules were cooled and transported to the centrifugal dryer in water with a temperature of 19° C. and a flow rate of 23 m³/h. The average cooling and transport time in water was approx. 2 seconds. The individual granules had an average weight of 0.0039 g. The granules were tabletted as described below.

Example 4

The type A gum composition of Table 1 was fed to the extruder with a feed rate of 250 kg/h and delivered to the inlet side of the die plate at a temperature of 109° C. and a pressure of 71 bar. The composition was extruded through a die plate having a temperature of 177° C. and 336 holes of a diameter of 0.36 mm. In the granulator chamber the extruded composition was cut to granules by a cutter with 8 blades on a central axle rotating with a cutter speed of 1999 rpm. The granules were cooled and transported to the centrifugal dryer in water with a temperature of 19° C. and a flow rate of 22 m³/h. The average cooling and transport time in water was approx. 2 seconds. The individual granules had an average weight of 0.0009 g. The granules were tabletted as described below.

Example 5

The type A gum composition of Table 1 was fed to the extruder with a feed rate of 250 kg/h and delivered to the inlet side of the die plate at a temperature of 109° C. and a pressure of 71 bar. The composition was extruded through a die plate having a temperature of 179° C. and 336 holes of a diameter of 0.36 mm. In the granulator chamber the extruded composition was cut to granules by a cutter with 8 blades on a central axle rotating with a cutter speed of 2800 rpm. The granules were cooled and transported to the centrifugal dryer in water with a temperature of 19° C. and a flow rate of 22 m³/h. The average cooling and transport time in water was approx. 2 seconds. The individual granules had an average weight of 0.0009 g; The granules were tabletted as described below.

Example 6

The type B gum composition of Table 1 was fed to the extruder with a feed rate of 200 kg/h and delivered to the inlet side of the die plate at a temperature of 109° C. and a pressure of 51 bar. The composition was extruded through a die plate having a temperature of 157° C. and 336 holes of a diameter of 0.36 mm. In the granulator chamber the extruded composition was cut to granules by a cutter with 8 blades on a central axle rotating with a cutter speed of 2800 rpm. The granules were cooled-and transported to the centrifugal dryer in water with a temperature of 13° C. and a flow rate of 21 m³/h. The average cooling and transport time in water was approx. 2 seconds. The individual granules had an average weight of 0.0008 g. The granules were tabletted as described below.

Example 7

The type C gum composition of Table 1 was fed to the extruder with a feed rate of 200 kg/h and delivered to the inlet side of the die plate at a temperature of 91° C. and a pressure of 80 bar. The composition was extruded through a die plate having a temperature of 157° C. and 336 holes of a diameter of 0.36 mm. In the granulator chamber the extruded composition was cut to granules by a cutter with 8 blades on a central axle rotating with a cutter speed of 2800 rpm. The granules were cooled and transported to the centrifugal dryer in water with a temperature of 11° C. and a flow rate of 21 m³/h. The average cooling and transport time in water was approx. 2 seconds. The individual granules had an average weight of 0.0009 g. The granules were tabletted as described below.

Tabletting:

The gum composition granules from the above examples were individually mixed in a standard mixer with flavour (menthol flavour crystals) and sweeteners (intense sweeteners: aspartame powder and acesulfame K; bulk sweetener: sorbitol, available from CERESTAR Scandinavia A/S, Denmark) as shown in Table 2.

TABLE 2

Mixture for pressed tablets

| Ingredient | % Wt. |
|---|---|
| gum composition granules | 39.48 |
| aspartame powder | 0.13 |
| acesulfame K powder | 0.13 |
| sorbitol powder | 58.04 |
| menthol flavour crystals | 2.22 |

Before pressing the mixtures passed a standard horizontal vibration sieve for removing any particles larger than 2.6 mm. The mixture was subsequently lead to a standard tablet pressing machine comprising dosing apparatus (P 3200 C, available from Fette GmbH, Germany) and pressed into compressed chewing gum tablets. The filling depth was 7.5 mm and the diameter 7.0 mm. The tablets were precompressed to 5.0 mm and then main compressed to 3.2 mm using a pressing pressure of 33.0-33.6 kN. There were 61 punches on the roter, and the rotor speed used was 11 rpm. The individual compressed tablets had a weight of approx. 1.5 g.

The products were assessed to have excellent properties with regard to cohesion and texture during the initial phase of chewing. All of the assessed tablets demonstrated good properties with regard to duration of taste.

Alternative mixtures of gum granules from examples with flavour and sweetener as shown in Table 3 were prepared.

TABLE 3

Alternative mixture for pressed tablets

| Ingredient | % Wt. |
|---|---|
| gum granules, example 2 | 23.57 |
| gum granules, example 3 | 15.91 |
| aspartame powder | 0.13 |
| acesulfame K powder | 0.13 |
| sorbitol powder | 58.04 |
| menthol flavour crystals | 2.22 |

The alternative mixtures of gum granules were processed and pressed into tablets as described above.

The obtained tablets had a good tight texture and provided a very satisfactory cohesion during the initial phase of chewing.

Whether gum granules are of a single average weight or a mixture of a plurality of average weights it is preferred that the additional ingredients mixed with the granules (bulk sweetener, compression aids etc.) are substantially free from fats and waxes. The amount of possibly added fats and waxes is suitably kept below 10% Wt. of the final compressed chewing gum tablets. With respect to the gum granules they can be without flavour or sweetener, but preferably the gum composition in the granules include at least 1% Wt. of flavour or sweetener.

The possible incorporation of sweetener and/or flavour in the granules assists in providing a longlasting taste in the tablets made from compressed granules.

Although the gum granules are useable without a coating it is for some embodiments preferred to coat the granules, such as with a coating comprising one or more coatings or ingredients selected from the groups comprising magnesium stearate, cornstarch, sugar compounds, polyols, cellulose ethers, acrylic polymers and copolymers, sugarless/sugarfree coatings, or waxes. The coating can be provided in any known manner within the art of coating chewing gum. The coating may serve to act as a tabletting aid or to protect the chewing gum composition core and retain moisture in the chewing gum during storing. The coating can also facilitate the filling of granules into tablet pressing forms. It is furthermore possible to coat the compressed chewing gum tablets, if so desired. Such a coating can be made of any suitable and known method.

The invention claimed is:

1. A method for producing chewing gum products, which method comprises at least the steps of:
    feeding a gum composition including at least gum base into an extruder,
    pressurizing the gum composition in the extruder,
    extruding the gum composition through a die plate,
    cutting the extruded gum composition in a liquid filled chamber, said cutting producing gum granules of weights per granule in the range of 0.0001 g to 0.008 g,
    mixing the extruded gum granules with one or more ingredients selected from the group consisting of flavours, bulk sweeteners, intense sweeteners, colouring agents, fillers, nutrients, pharmaceuticals, and tabletting aids,
    conveying the extruded and cut granules mixed with said one or more ingredients to a tablet pressing apparatus, and then
    compressing at least said gum granules into compressed chewing gum tablets.

2. The method of claim 1, wherein said weight per granule is in the range of 0.0003 g to 0.008 g.

3. The method of claim 1, wherein the weight per granule for at least a first fraction of the granules is in the range of 0.0003 g to 0.003 g.

4. The method of claim 1, wherein the weight per granule for at least a first fraction of the granules is less than 0.002 g.

5. The method of claim 1, wherein the weight per granule for at least a second fraction of the granules is in the range of 0.002 to 0.008 g.

6. The method of claim 1, wherein the weight per granule for at least a second fraction of the granules is in the range of 0.002 g to 0.005 g.

7. The method according to claim 1, wherein the granules in a first fraction have a first average weight which is lower than the average weight of a second fraction of the extruded granules.

8. The method of claim 1, wherein the gum composition during extruding is extruded though die openings in a die plate having openings of at least two different sizes to simultaneously obtain granules with different average weights.

9. The method of claim 1, wherein the cut granules are cooled in water during transfer from the liquid filled chamber to a de-watering device, and the transfer time from cutting to de-watering is less than 6 s.

10. The method of claim 9, comprising the further step of dusting the granules in between de-watering and conveyance to the tablet pressing apparatus.

11. The method of claim 1, wherein the cut granules are cooled in water during transfer from the liquid filled chamber to a de-watering device, and the transfer time from cutting to de-watering is less than 4 s.

12. The method of claim 11, comprising the further step of coating the granules in between de-watering and conveyance to the tablet pressing apparatus.

13. The method of claim 1, comprising the further step of providing the granules with one or more ingredients before conveying the granules to the tablet pressing apparatus, said one or more ingredients being selected from the group consisting of magnesium stearate, cornstarch, sugar compounds, polyols, cellulose ethers, acrylic polymers and copolymers, sweeteners, flavours, waxes, and colours.

14. The method of claim 1, comprising the further step of dusting the granules before conveying the granules to the tablet pressing apparatus, wherein the dusting is made with the sweetener sorbitol.

15. The method of claim 1, comprising the further step of classifying the granules prior to conveyance to the tablet pressing apparatus.

16. The method of claim 1, wherein the gum composition is gum base.

17. The method of claim 1, wherein the gum composition includes one or more flavouring agents when extruded.

18. The method of claim 1, wherein the gum composition includes one or more sweeteners, such as intense sweeteners, when extruded.

* * * * *